United States Patent
Simonini

(10) Patent No.: US 9,096,135 B1
(45) Date of Patent: Aug. 4, 2015

(54) ACCELERATION CONTROL FOR AN ELECTRIC VEHICLE

(71) Applicant: Proterra Inc., Greenville, SC (US)

(72) Inventor: Matthew Simonini, Greenville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/498,422

(22) Filed: Sep. 26, 2014

(51) Int. Cl.
| | | |
|---|---|---|
| *G05D 1/00* | (2006.01) | |
| *H02P 7/00* | (2006.01) | |
| *B60L 11/18* | (2006.01) | |
| *H02P 6/08* | (2006.01) | |
| *H02P 7/06* | (2006.01) | |
| *B60W 20/00* | (2006.01) | |
| *H02H 7/085* | (2006.01) | |
| *H02H 7/08* | (2006.01) | |

(52) U.S. Cl.
CPC .............. *B60L 11/1803* (2013.01); *H02P 6/08* (2013.01); *H02P 7/06* (2013.01); *B60W 20/00* (2013.01); *H02H 7/0833* (2013.01); *H02H 7/0851* (2013.01)

(58) Field of Classification Search
None
See application file for complete search history.

(56) References Cited

U.S. PATENT DOCUMENTS

| | | | | |
|---|---|---|---|---|
| 4,021,712 A | * | 5/1977 | Ishihara et al. ................ 318/432 |
| 4,075,538 A | * | 2/1978 | Plunkett .......................... 318/52 |
| 4,730,151 A | * | 3/1988 | Florey et al. .................. 318/376 |
| 5,492,192 A | * | 2/1996 | Brooks et al. ................. 180/165 |
| 6,976,388 B2 | * | 12/2005 | Heap et al. .................. 73/115.02 |
| 7,021,409 B2 | * | 4/2006 | Tamor ......................... 180/65.25 |
| 7,117,963 B2 | * | 10/2006 | Saito et al. .................... 180/65.1 |
| 7,617,896 B2 | * | 11/2009 | Ogata ........................... 180/65.7 |
| 2001/0041957 A1 | * | 11/2001 | McCann et al. ................ 701/41 |
| 2001/0051290 A1 | * | 12/2001 | Kashiwagi ........................ 429/9 |
| 2005/0143877 A1 | * | 6/2005 | Cikanek et al. ................. 701/22 |
| 2009/0021203 A1 | * | 1/2009 | Claeys et al. ................. 318/452 |
| 2009/0101428 A1 | * | 4/2009 | Itoh ............................... 180/197 |
| 2009/0210128 A1 | * | 8/2009 | Fujimoto et al. ................ 701/84 |
| 2009/0255746 A1 | * | 10/2009 | Boesch ......................... 180/197 |
| 2010/0152938 A1 | * | 6/2010 | Aoki et al. ....................... 701/22 |
| 2010/0280694 A1 | * | 11/2010 | Noiret ............................. 701/22 |
| 2011/0172864 A1 | * | 7/2011 | Syed et al. ...................... 701/22 |
| 2012/0038215 A1 | * | 2/2012 | Berry et al. ...................... 307/77 |
| 2013/0231817 A1 | * | 9/2013 | Werner et al. ................... 701/22 |
| 2014/0244082 A1 | * | 8/2014 | Caron ............................. 701/22 |
| 2014/0330470 A1 | * | 11/2014 | Ozaki et al. .................... 701/22 |

\* cited by examiner

*Primary Examiner* — Mussa A Shaawat
(74) *Attorney, Agent, or Firm* — Bookoff McAndrews, PLLC

(57) ABSTRACT

An electric vehicle includes an electric motor configured to provide traction and a control system. The control system may be configured to receive a signal indicative of a requested torque and determine an acceleration limit based on the requested torque. The electric vehicle may also include an inverter operatively coupled to the control system and the electric motor. The inverter may be configured to control the electric motor based at least on (a) a signal indicative of the requested torque, and (b) a signal indicative of the acceleration limit.

19 Claims, 3 Drawing Sheets

ACCELERATION CONTROL FOR AN ELECTRIC VEHICLE

TECHNICAL FIELD

Embodiments of this disclosure relate to methods and systems to control the acceleration of an electric vehicle.

BACKGROUND

In an electric vehicle, or a hybrid vehicle operating in the electric mode, an electric motor serves as the source of power for the vehicle. In such vehicles, a battery provides power to drive the motor and a controller controls the operation of the motor. When the driver of the vehicle presses down on the gas pedal, the controller detects the position of the pedal and sends a signal to the motor to increase its speed. When the driver removes his foot from the gas, the controller sends a signal to the motor to decrease its speed. By pressing down on the gas pedal, the driver of the electric vehicle is capable of accelerating as fast as the engine power will allow the vehicle. High acceleration rates increase safety concerns. Additionally, high uncontrolled acceleration is inefficient with regard to power consumption, and uncomfortable for the passengers of the vehicle. The current disclosure discloses systems and methods of controlling a vehicle that alleviates some of the concerns discussed above. The scope of the current disclosure, however, is defined by the attached claims, and not by the ability to solve any specific problem.

SUMMARY

Embodiments of the present disclosure relate to, among other things, devices and methods for controlling the motor of an electric vehicle, and electric vehicles that incorporate the control methodology. Each of the embodiments disclosed herein may include one or more of the features described in connection with any of the other disclosed embodiments.

In one embodiment, an electric vehicle is disclosed. The electric vehicle may include an electric motor configured to provide fraction and a control system. The control system may be configured to receive a signal indicative of a requested torque and determine an acceleration limit based on the requested torque. The electric vehicle may also include an inverter operatively coupled to the control system and the electric motor. The inverter may be configured to control the electric motor based at least on (a) a signal indicative of the requested torque, and (b) a signal indicative of the acceleration limit.

In another embodiment, an electric vehicle is disclosed. The electric vehicle may include a powertrain powered by an electric motor. The electric vehicle may also include a control system configured to (a) receive a signal indicative of a requested torque, (b) determine an acceleration limit based on the requested torque, and (c) control the electric motor to deliver a value of torque less than or equal to the requested torque without exceeding the acceleration limit.

In yet another embodiment, a method of operating an electric vehicle is disclosed. The method may include receiving a signal indicative of a requested torque and determining an acceleration limit based at least on the requested torque. The method may also include controlling the electric motor to deliver a value of torque less than or equal to the requested torque without exceeding the acceleration limit.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods for controlling the acceleration of an electric vehicle. While principles of the current disclosure are described with reference to an electric bus, it should be understood that the disclosure is not limited thereto. Rather, the systems and methods of the present disclosure may be used in any electric or hybrid vehicle or machine.

Figure 1:
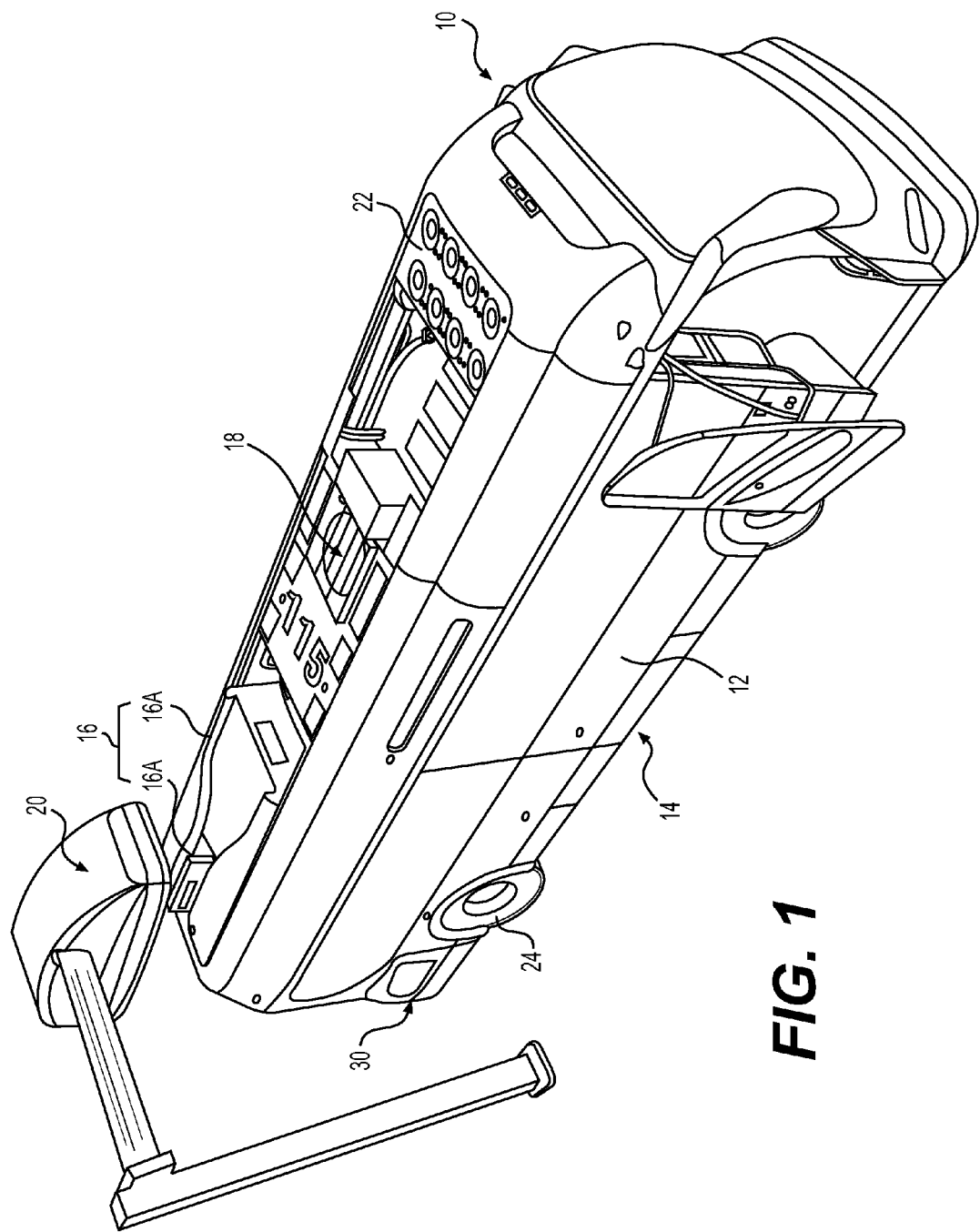
FIG. 1 is an illustration of an exemplary electric bus.

FIG. 1 illustrates an electric vehicle in the form of an electric bus 10. Electric bus 10 may include a body enclosing a space for passengers. In some embodiments, some (or substantially all) parts of body 12 may be fabricated using one or more composite materials to reduce the weight of bus 10. Without limitation, body 12 of bus 10 may have any size, shape, and configuration. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches from the road surface. In this disclosure, the term "about" is used to indicate a possible variation of ±10% in a stated numeric value.

Bus 10 may include a powertrain 30 that propels the bus 10 along a road surface. Powertrain 30 may include an electric motor 38 (FIG. 2) that generates power, and a transmission 40 (FIG. 2) that transmits the power to drive wheels 24 of the bus 10. Batteries 14 may store electrical energy to power the electric motor 38. In some embodiments, these batteries 14 may be positioned under the floor of the bus 10, and may be configured as a plurality of battery packs. In some embodiments, these battery packs may be positioned in spaced apart cavities (not shown) located under the floor of the bus 10. Although batteries 14 are described as being positioned under the floor of the bus 10, this is only exemplary. In some embodiments, some or all of the batteries 14 may be positioned elsewhere on the bus 10. For example, some or all of the batteries 14 may be positioned on the roof of bus 10.

The batteries 14 may have any chemistry and construction. The battery chemistry and construction may enable fast charging of the batteries 14. In some embodiments, the batteries may be lithium titanate batteries. It is also contemplated that, in some embodiments, the batteries 14 may include multiple different chemistries. For instance, some of the batteries 14 may be lithium titanate batteries, while others may have another chemistry (for example, lead-acid, nickel cadmium, nickel metal hydride, lithium ion, zinc air, etc.). Some of the possible battery chemistries and arrangements in bus 10 are described in commonly assigned U.S. Pat. No. 8,453,773 which is incorporated herein by reference in its entirety.

A charging interface 16 may be provided on the bus 10 (e.g., on the roof, side wall, undercarriage, etc.) to charge the batteries 14. The charging interface 16 may include components that interface with an external charging station to charge the batteries 14. These components may include a charging blade 16a and an alignment scoop 16b. The alignment scoop 16b may align and direct a charging brace (not shown) of the external charging station 20 towards the charging blade 16a to electrically connect them and charge the batteries 14. Some possible embodiments of charging interfaces 16 that may be used for bus 10 are described in commonly-assigned U.S. Patent Application Publication No. 2014/0070767, which is incorporated by reference in its entirety herein.

Alternatively or additionally, bus 10 may also include an on-board charging device to charge the batteries 14. The on-board charging device may include an auxiliary power generation device (such as, an internal combustion engine or a fuel cell positioned, for example, on the roof) that generates power to charge the batteries 14. In some embodiments, bus 10 may be a pure electric vehicle and thus does not include an internal combustion engine.

Bus 10 may also include components such as an HVAC system 18 to cool the passenger compartment, and a radiator 22 to cool the heat producing components of bus 10. A coolant may circulate between the radiator 22 and the heat producing components (such as, for example, motor, batteries, etc.) to dissipate heat produced by these components. Although the HVAC system 18, the radiator 22, and the charging interface 16 are illustrated as being positioned on the roof of the bus 10, in general, these components may be positioned anywhere on the bus 10.

Figure 2:
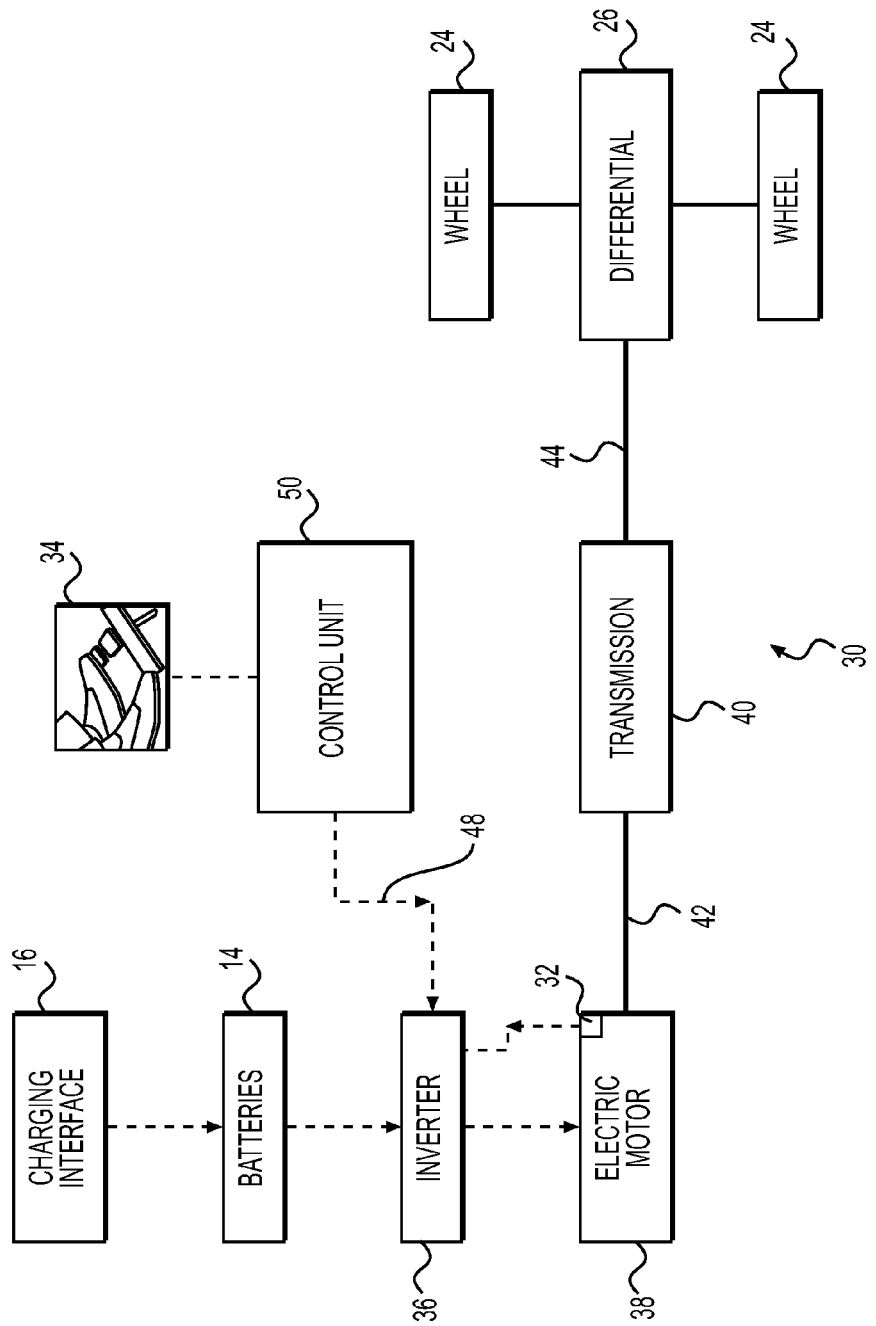
FIG. 2 is a schematic illustration of an exemplary powertrain of the bus of FIG. 1.

FIG. 2 is a schematic illustration of the powertrain 30 coupled to the drive wheels 24 of the bus 10 through the transmission 40. Powertrain 30 may be powered by an electric motor 38. The electric motor 38 may be a permanent magnet synchronous motor (AC motor) that operates using power from the batteries 14. In some embodiments, high voltage DC power from the batteries 14 may be converted into 3-phase AC power using an inverter 36 and directed to electric motor 38. The motor 38 drives the input shaft 42 to the transmission 40. An output shaft 44 from the transmission rotates the drive wheels 24 through differential 26. In general, the torque output of the electric motor 38 is proportional to the magnitude of the current directed into the electric motor 38. Although the electric motor 38 is described as a permanent magnet synchronous motor, other types of motors may be used in powertrain 30. In some embodiments, bus 10 may include multiple power sources such as batteries 14 and one or more fuel cells.

The transmission 40 may include a plurality of gears (not shown) with the ability to switch between different gear ratios to convert the rotation speed (and torque) of the input shaft 42 to several different speeds (and torques) of the output shaft 44. While, in general, any type of transmission 40 with any number of gear ratios may be used in bus 10, in some embodiments, transmission 40 may be an automated manual transmission that provides two gear ratios using a set of planetary gears. As is known in the art, the planetary gears may include sun, ring, and carrier gears, with planetary gears coupled thereto. Transmission 40 may also include a plurality of clutches adapted to selectively couple several of the gears together to change the gear ratio between the input shaft 42 and the output shaft 44 based on instructions from the control unit 50. Additionally, as is known in the art, transmission 40 may include other devices such as, for example, synchronizers that equalize the speed difference between the input and output shafts 42, 44.

The control unit 50 may be configured to control various operations of the powertrain 30. Control unit 50 may be a device dedicated to controlling operations of the powertrain 30, or it may be part of a larger control unit that controls several operations (for example, HVAC control, door opening/closing, kneeling, etc.) of the bus 10. As is known in the art, control unit 50 may include a collection of several mechanical, electrical, and integrated circuit devices (for example, computational units, A/D converters, memory, switch, valves, actuators, fuses, etc.) that function collectively to control the operation of the powertrain 30.

The control unit 50 may control the operation of the powertrain 30 based on several inputs from the bus 10. These inputs may include signals indicative of operation of the bus 10 (e.g., state of charge of the batteries, speed of the bus, environmental conditions, driver desired speed, etc.). In some embodiments, an input to the control unit 50 may include a signal indicative of the position of the accelerator pedal (accelerator 34) of the bus 10. In use, the driver of the bus 10 may step on the accelerator 34 to accelerate the bus 10. A position sensor (not shown) operatively coupled to the accelerator 34 may convert the accelerator 34 position to a voltage signal. This voltage signal may be directed into the control unit 50. The voltage signal from the accelerator 34 may be indicative of a torque request (or desired acceleration) of the bus 10. Based on the voltage signal from the accelerator 34, the control unit 50 may send instructions to the inverter 36.

As is known in the art, inverter 36 may be an electronic device (or circuitry) adapted to convert direct current (DC) from the battery 14 to alternating current (AC). In response to instructions 48 (see FIG. 3) from the control unit 50, the inverter 36 may activate IGBTs (Insulated-gate bipolar transistors) or other switches of the inverter 36 to convert the direct current from the batteries 14 to simulated AC current for the electric motor 38. The inverter 36 may select the voltage and the frequency of the AC current to produce the desired torque output (or acceleration). Motor 38 may include one or more sensors 32 (speed sensor, torque sensor, etc.) configured to provide a signal indicative of the output torque of the motor 38 to the inverter 36. Based on output from the sensor 32, the inverter 36 may modify (increase, decrease, etc.) the current directed to the motor 38 to produce the desired torque output. Additionally or alternatively, in some embodiments, the inverter 36 may include a sensor (current sensor, etc.) that measures the current directed to the motor 38. Since, the torque produced by the motor 38 is proportional to the current directed to it, the inverter 36 may use the detected current as a feedback signal for the torque output. Although FIG. 2 illustrates the sensor 32 as providing input to the inverter 36, in some embodiments, the input from the sensor 32 may additionally or alternatively be directed to the control unit 50. In such embodiments, the control unit 50 may provide instructions 48 to the inverter 36 based also on the detected current.

Figure 3:
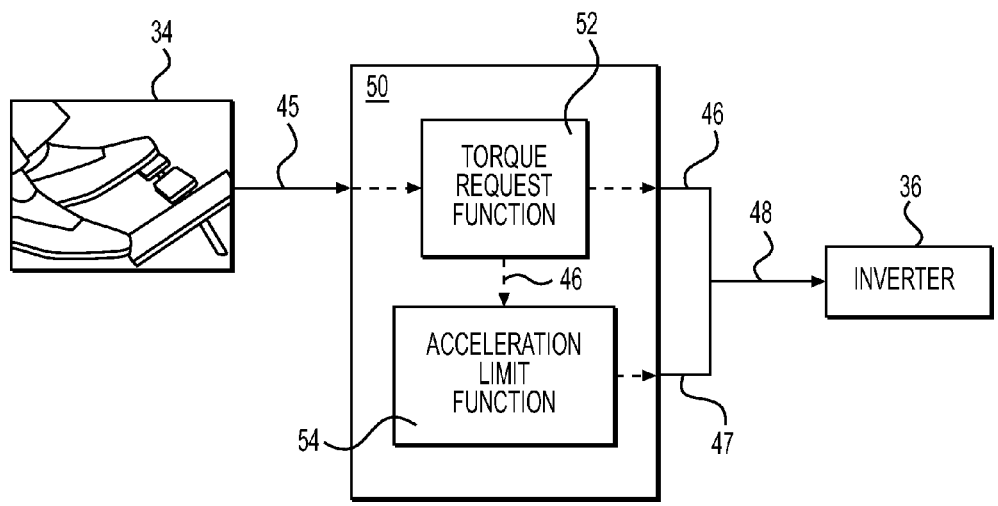
FIG. 3 is a schematic illustration of an exemplary powertrain control unit of the bus of FIG. 1.

FIG. 3 is a schematic illustration of the interaction between the control unit 50 and the inverter 36. As explained previously, control unit 50 sends instructions 48 to the inverter 36 in response to a signal 45 indicative of the desired torque from the accelerator 34. Among other systems, control unit 50 may include a torque request function 52 and an acceleration limit function 54. Torque request and acceleration limit functions 52, 54 may include electronic components (or systems) and/or algorithms configured to produce a signal that may be directed to the inverter 36. The torque request function 52 may be a module that converts a signal 45 indicative of the position of the accelerator 34 pedal into a torque request 46. In some embodiments, signal 45 may include a voltage signal output by a position sensor (e.g., an optical encoder) operatively coupled to the accelerator 34. The torque request function 52 may translate the input voltage into a torque request 46. In some embodiments, torque request function 52 may include a map (table, graph, etc.), an empirical relation, or an equation that converts the voltage signal to the torque request 46. This torque request 46 may be directed to the inverter 36.

Figure 4:
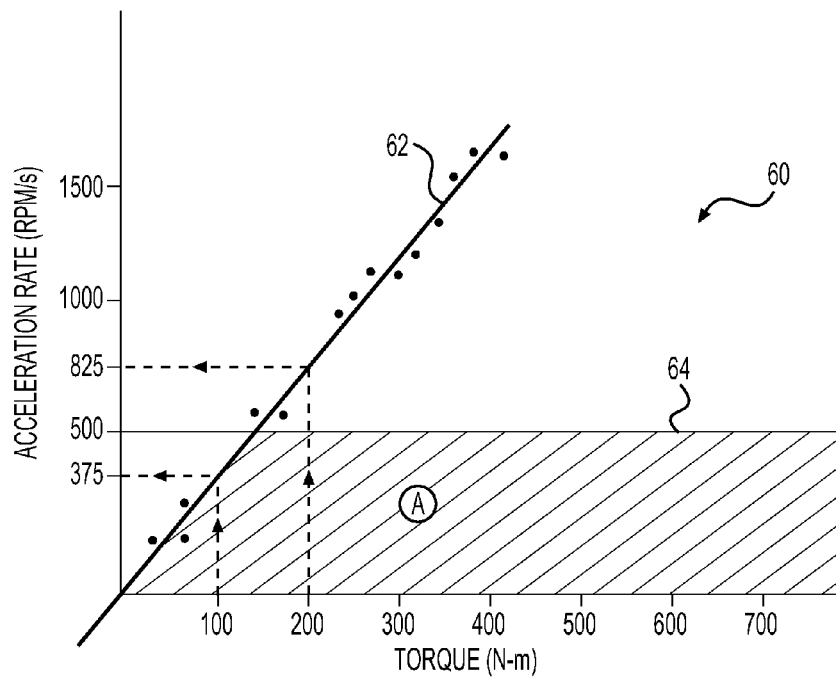
FIG. 4 is an graphical illustration of an exemplary acceleration limit function of the control unit of FIG. 3.

The acceleration limit function 54 may output an acceleration limit 47 for the torque request 46. The acceleration limit 47 may indicate the maximum acceleration rate that may applied by the electric motor 38 for a given torque request 46. FIG. 4 is a schematic illustration of a chart 60 that may be used in the acceleration limit function 54. Chart 60 is a plot of acceleration rate of the bus 10 at different torque levels. Chart 60 may include a natural acceleration curve (curve 62) that indicates the natural acceleration rate of the bus 10 at different torques. Natural acceleration rate of the bus 10 may be the acceleration rate experienced by the bus when the bus 10 is accelerated to output a torque value. For example, experiments may be conducted to determine the acceleration rate experienced by the bus 10 when it accelerated to output different values of torque. Curve 62 may also be generated using historic data. A numerical curve fit (e.g., least squares curve fit, nonlinear curve fit, smoothing curve fit, etc.) through data points of acceleration rates of the bus 10 at different torque outputs may be used as curve 62. Although FIG. 4 illustrates curve 62 as linear, this is not a requirement. In general, curve 62 may have any shape (piece-wise linear, nonlinear curve, etc.). Based on curve 62, the acceleration limit function 54 may determine the required acceleration rate of the bus 10 for every torque request 46 output by the torque request function 52. For instance, as illustrated in FIG. 4, if torque request function 52 outputs a torque request 46 of 100 N-m, chart 60 may indicate that the required acceleration rate of the bus 10 to produce this torque request 46 is about 375 RPM/s.

Chart 60 may also include a maximum acceleration limit 64 curve. The maximum acceleration limit 64 may indicate the maximum value of acceleration rate that may be produced by the motor 38. The maximum acceleration limit 64 may be determined in any manner. In some applications (e.g., transit buses, etc.), government regulations may dictate the maximum acceleration of the bus 10. In such embodiments, the maximum acceleration limit 64 curve indicates the regulated maximum acceleration. In some embodiments, the maximum acceleration limit 64 curve may be selected based on factors such as, fuel economy, driver/passenger feel, etc. For example, prior experience may indicate that high acceleration rates increase power consumption significantly. Similarly, prior experience may indicate that a very low acceleration limit negatively affects driver feel, and a very high acceleration limit negatively affects passenger comfort. The maximum acceleration limit 64 curve may be selected to maintain power consumption and passenger comfort at acceptable levels without significantly affecting driver feel.

Although FIG. 4 illustrates the maximum acceleration limit 64 curve as a linear line, this is only exemplary. In general, the maximum acceleration limit 64 curve may have any form and shape (linear, piece-wise linear, curved, etc.). In some embodiments, the maximum acceleration limit 64 may be a static curve (which does not change over time), while in other embodiments, the maximum acceleration limit 64 may be a dynamic curve (which changes over time). In some embodiments, the maximum acceleration limit 64 may change with operating parameters of the bus 10. For example, the maximum acceleration limit 64 may decrease when the state of charge, or available power, of the battery 14 decreases below a predetermined value, or when the temperature of one or more components (gears, switches, batteries, etc.) exceeds a predetermined value. It is also contemplated that, in some embodiments, the maximum acceleration limit 64 of chart 60 changes based on environmental factors (e.g., when it is raining or snowing, etc.) and/or based on the operational status of a component (e.g., when the wiper of the bus is on or off).

The acceleration limit function 54 may determine the acceleration limit 47 based on the natural acceleration curve 62 and the maximum acceleration limit 64. The acceleration limit 47 is the lower of the acceleration rate value that produces the desired torque output and the preset maximum acceleration limit 64. For example, if the torque request function 52 indicates (based on the acceleration 34 position) a torque request 46 of 100 N-m, the acceleration limit function 54 may apply an acceleration limit 47 of 375 RPM/sec to the inverter 36. However, if the torque request 46 is 200 N-m, the acceleration limit function 54 will only apply an acceleration limit 47 of 500 RPM/sec to the inverter 36 (that is, the lower of 825 RPM/sec which will produce the desired torque, and the preset maximum acceleration limit of 500 RPM/s).

The hatched region of chart 60 (marked zone A) indicates the values of allowable acceleration limits 47 that may be applied by the acceleration limit function 54 to the inverter 36. The inverter 36 may vary the parameters of the current directed to the motor 32 to produce the desired torque without exceeding the allowable acceleration limit 47. The inverter 36 may control the motor 32 to meet the above described goal by any method. In some embodiments, if the control unit 50 directs a torque request 46 of 200 N-m, and an allowable acceleration limit 47 of 500 RPM/sec, the inverter 36 will initially apply the current necessary to produce a torque of 200 N-m. As the motor speed changes, its acceleration rate may be calculated. If the calculated acceleration rate exceeds 500 RPM/sec, the inverter 36 will decrease the current (and the torque produced) to bring the acceleration rate to (or below) 500 RPM/sec. Once the acceleration rate is at 500 PRM/sec, the inverter 36 may maintain the acceleration rate while the torque request 47 is at 200 N-m. It should be noted that although FIG. 3 indicates the instructions 48 from the control unit 50 to the inverter 36 as including both the acceleration limit 47 and the torque request 46, this is only exemplary. In some embodiments, the acceleration limit 47 and the torque request 46 may be directed separately to the inverter 36. It is also contemplated that, in some embodiments, instructions 48 may include other data in addition to the acceleration limit 47 and the torque request 46.

Electric motors deliver torque in a smooth manner. However, due to practical inefficiencies such as gear play, vibration, etc., the powertrain 30 of bus 10 experiences short term torque pulses (a toque pulse which fluctuates in a time window of less than a couple of seconds) which negatively affects ride quality. Inverter 36 includes an damping feature that subdues these short term torque pulses to maintain a smooth torque in the powertrain 30. Inverter 36 may employ any damping method (e.g., apply a corrective torque signal, etc.) to subdue the short term torque pulses. Since damping techniques are well known in the art, these techniques are not discussed herein. When a short-term torque pulse causes the acceleration rate to exceed zone A, the damping feature of the inverter 36 subdues the torque pulse to maintain a smooth torque pulse.

Typically, vehicles powered by internal combustion engines do not have an efficient method for limiting engine power based on vehicle acceleration. Therefore the driver is capable of driving as fast as the engine power will take the bus. This may be inefficient if the driver always "floors it," and may also cause varied performance depending on passenger load of the vehicle and road surface grade. The control unit and/or inverter of the current disclosure has the capability to determine acceleration limits for different requested torques, to monitor acceleration, and vary the applied torque to ensure that acceleration limits are followed. With the addition of acceleration limiting, there is an additional benefit to actively dampen driveline oscillations. This active dampening is enabled because the control unit and/or the inverter knows what is expected versus unexpected acceleration. Based on this information, the control unit and/or the inverter has the capability to quickly damp the unexpected accelerations and thus reduce driveline oscillations.

While principles of the present disclosure are described herein with reference to an electric bus, it should be understood that the disclosure is not limited thereto. Rather, the systems and methods described herein may be employed to any electric or hybrid vehicle. Also, those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

I claim:

1. An electric vehicle, comprising:
   an electric motor configured to provide traction;
   a control system configured to receive a signal indicative of a requested torque and determine (i) a first acceleration, the first acceleration being indicative of an acceleration of the electric motor that provides the requested torque, and (ii) a second acceleration, the second acceleration being a threshold acceleration of the electric motor; and
   an inverter operatively coupled to the control system and the electric motor, the inverter being configured to control the electric motor to provide a lower value of (a) first acceleration and (b) the second acceleration.

2. The vehicle of claim 1, wherein the control system is configured to determine the first acceleration based at least on a chart of acceleration values at different torque values.

3. The vehicle of claim 1, wherein the second acceleration is a constant value.

4. The vehicle of claim 1, wherein the second acceleration is a dynamic value that varies based on at least one of (i) a state of charge of a battery of the vehicle, (ii) available battery power, and (iii) a temperature of a component of the vehicle.

5. The vehicle of claim 1, wherein the signal indicative of requested torque is a voltage signal that is indicative of a position of an accelerator of the vehicle.

6. The vehicle of claim 5, wherein the control system is configured to convert the voltage signal to a torque request.

7. An electric vehicle, comprising:
   a powertrain powered by an electric motor;
   a control system configured to (a) receive a signal indicative of a requested torque, (b) determine a requested acceleration based on the requested torque, (c) determine an acceleration limit, and (d) control the electric motor to provide a lower value of the requested acceleration and the acceleration limit.

8. The vehicle of claim 7, wherein the control system is configured to determine the requested acceleration based at least on a chart of acceleration values at different torque values.

9. The vehicle of claim 7, wherein the acceleration limit is a predetermined threshold acceleration value.

10. The vehicle of claim 7, wherein the acceleration limit is a constant value.

11. The vehicle of claim 7, wherein the acceleration limit is a dynamic value that varies based on at least one of (i) a state of charge of a battery of the vehicle, (ii) available battery power, and (iii) a temperature of a component of the vehicle.

12. The vehicle of claim 7, wherein the signal indicative of requested torque is a voltage signal that is indicative of a position of an accelerator of the bus.

13. The vehicle of claim 12, wherein the control system is configured to convert the voltage signal to a torque request.

14. The vehicle of claim 7, wherein the vehicle is a bus.

15. A method of operating an electric motor of an electric vehicle, comprising:
    receiving a signal indicative of a requested torque;
    determining a requested acceleration based at least on the requested torque;
    determining an acceleration limit, the acceleration limit being indicative of a maximum desired acceleration of the electric motor; and
    controlling the electric motor to provide a lower of the requested acceleration and the acceleration limit.

16. The method of claim 15, wherein the acceleration limit is a predetermined threshold acceleration value.

17. The method of claim 16, wherein the threshold acceleration value is a constant value.

18. The method of claim 15, wherein the acceleration limit is a dynamic value that varies based on at least one of (i) a state of charge of a battery of the vehicle, (ii) available battery power, and (iii) a temperature of a component of the vehicle.

19. The method of claim 15, wherein receiving a signal indicative of a requested torque includes receiving a voltage signal that is indicative of a position of an accelerator of the vehicle.

* * * * *